No. 790,497. PATENTED MAY 23, 1905.
E. L. HALL.
PHOTOGRAPHIC CAMERA.
APPLICATION FILED SEPT. 3, 1904.

3 SHEETS—SHEET 2.

Witnesses
S. J. Hoester
P. F. Smith

Edward L. Hall
Inventor
By his Attorneys Knight Bro.

No. 790,497. PATENTED MAY 23, 1905.
E. L. HALL.
PHOTOGRAPHIC CAMERA.
APPLICATION FILED SEPT. 3, 1904.
3 SHEETS—SHEET 3.
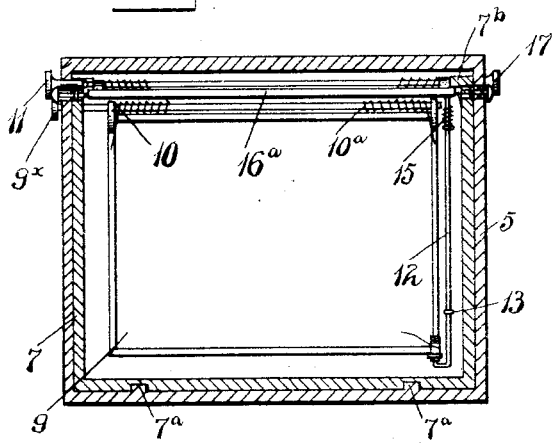
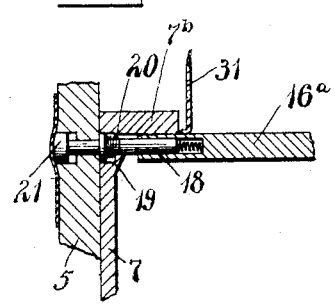
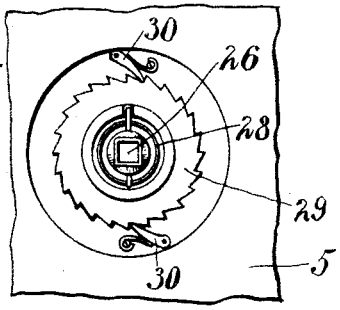
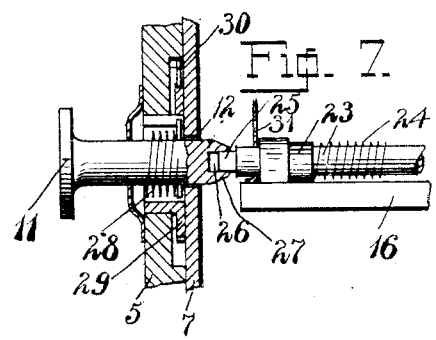
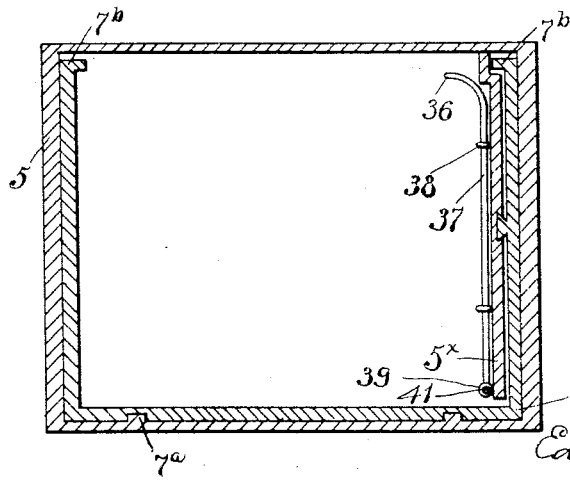
Witnesses
S. J. Hoexter
P. F. Smith
Edward L. Hall
Inventor
By his Attorneys
Knight Bros No. 790,497. Patented May 23, 1905.

UNITED STATES PATENT OFFICE.

EDWARD LANDER HALL, OF BROOKLYN, NEW YORK.

PHOTOGRAPHIC CAMERA.

SPECIFICATION forming part of Letters Patent No. 790,497, dated May 23, 1905.

Application filed September 3, 1904. Serial No. 223,227.

*To all whom it may concern:*

Be it known that I, EDWARD LANDER HALL, a citizen of the United States, residing in Brooklyn, in the county of Kings and State of New York, have invented certain new and useful Improvements in Photographic Cameras; and in order that my invention may be understood and practiced by those skilled in the art I give the following specification.

My invention relates to photographic cameras of the type sometimes known as "view-cameras," in which the full-size image may be inspected by the operator by means of a suitable reflecting-surface. Cameras of this class are usually bulky and inconvenient to carry, for the reason that their construction prevents them from being collapsed or folded into small compass.

The objects of my invention are to provide a camera of this class which may be readily collapsed or folded into compact dimensions so as to occupy small space and to be conveniently carried; to provide means whereby the focusing-screen is mounted and held in the focal plane of the lens to permit of greater accuracy in focusing than is ordinarily possible with cameras of this kind; to provide means for automatically removing the focusing-screen from the focal plane of the lens when exposure is to be made; to provide means for supporting the reflecting-mirror so that it forms one wall or inner surface of the camera; to provide means for the ready angular adjustment of the reflecting-surface to allow of inspection of the image; to provide means whereby the mirror is covered to prevent reflection of light within the camera when an exposure is made; to provide means whereby the shutter of the lens is automatically operated when the focusing-screen is removed from the focal plane; to provide means whereby the focusing-screen, the mirror, and other parts of the camera are so supported as to leave the interior of the camera unobstructed, and to provide means whereby all the parts may be compactly folded within the body of the camera for transportation.

The manner in which the several objects of the invention are accomplished is described in detail in the following specification, and the novel features thereof are pointed out in the claims.

The accompanying drawings illustrate a camera embodying my invention.

Figure 1:
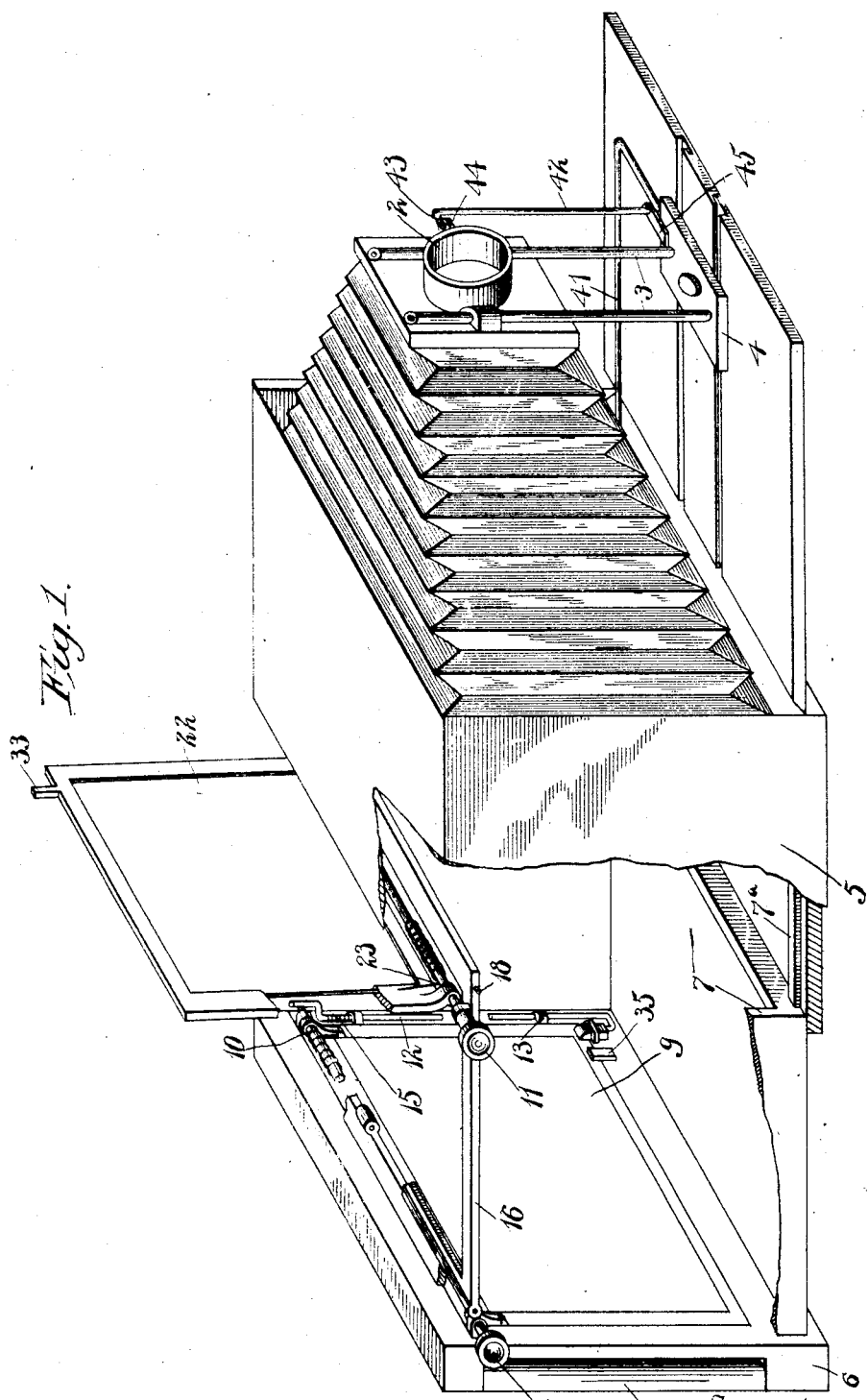
Figure 2:
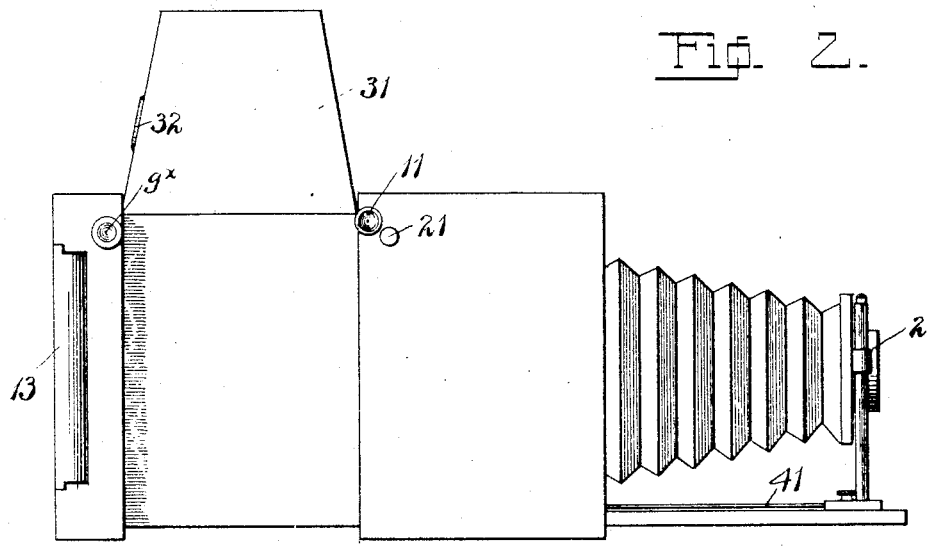
Figure 3:
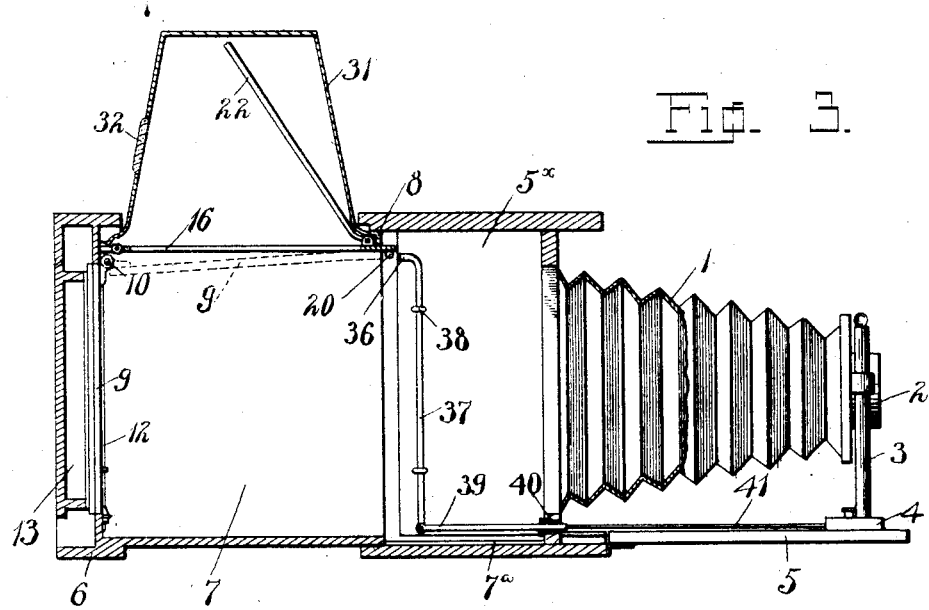

Figure 1 is a perspective view of a camera embodying my invention, parts being broken away to show the construction and arrangement. Fig. 2 is a side elevation. Fig. 3 is a longitudinal view, partly in section. Fig. 4 is a transverse sectional view. Figs. 5, 6, and 7 are details. Fig. 8 is a transverse sectional view showing the construction of the inner wall.

The same reference-numerals are applied to corresponding parts in the several views of the drawings.

Numeral 1 indicates the ordinary bellows attached to the front board of the camera. 2 indicates the lens suitably guided and supported upon standards 3, secured in the base or foot-piece 4, mounted to slide on the bed, which folds up in the usual manner when the camera is closed. These features are of ordinary and well-known construction and form no part of my invention. Further description thereof is deemed unnecessary.

The camera-box is indicated by the numeral 5 and the back portion by the numeral 6. The back portion 6 is mounted so that when the camera is closed it abuts against the box 5 with all the parts folded on the interior. Any suitable and convenient folding means may be employed, whether bellows or otherwise.

In the form of my invention illustrated in the drawings I have shown the back 6 as attached to a three-sided box 7, which slides within the box 5 when the camera is collapsed, suitable strips $7^a$ being provided for guides. One side of the box 5 is provided with an inner wall or strip $5^x$, between which and the outer wall the side 7 of the inner box slides. The top portion of the side pieces of the box 7 are provided with inwardly-extending flanges $7^b$, Figs. 4 and 5, and a flange 8 is secured on the inner face of the top of the box 5, against which the flanges $7^b$ slide. A spring thumb-piece 11 is mounted in the side of the box 5, and when the back 6 is withdrawn to the limit of its movement such thumb-piece 11 snaps into a hole 12 in the adjacent side of the box 7 and prevents further withdrawal. The back 6 is provided with any suitable and convenient means, such as 13, for holding the plate or roll holder containing the sensitive surface. On the inner face of the back 6 is mounted the focusing-screen 9, said screen being hinged to the back by a spring-hinge 10, the spring 10$^a$ of which tends to throw the screen 9 upwardly into a horizontal position. (Shown in dotted lines in Fig. 3.) A thumb-piece 9$^x$ is provided on the hinge 10 to return the screen 9 into vertical position. The screen 9 is normally held in the focal plane by means of a spring-latch, attached to which is a push-rod 12, mounted in guides 13 on the back 6. Spring 15 tends to keep the latch in position to hold the screen 9 in its vertical position. Also hinged to the back 6 is a frame 16. A thumb-piece 17 is provided on the hinge of frame 16, by means of which said frame may be thrown into horizontal position, as shown in Figs. 1 and 3. The frame 16 when thrown into its horizontal position abuts against the under side of side flanges 7$^b$ and the front flange 8. On the forward portion of the frame 16 are mounted spring-bolts 18, which when the frame 16 is thrown upwardly ride over lugs or projections 19 on the inner sides of the box 7 and snap over the same to hold the frame 16 in its raised position. (See Fig. 5.) Mounted in the sides of the box 7 and in alinement with the bolts 18 are spring-mounted pins 20, and mounted in the sides of box 5 and in alinement with pins 20 are push-buttons 21. The object of pins 20 and buttons 21 is to release the bolts 18 from the lugs 19 and allow the frame 16 to drop into vertical position.

Hinged on the forward portion of the frame 16 is the reflecting-mirror 22, the hinge being indicated by the numeral 23. This hinge is provided with a spring 24, tending to hold the mirror 22 horizontal or parallel in the frame. When the camera is extended and the mirror-frame 16 is brought up to its horizontal position and held there by the bolts 18, the end of hinge 23 is in alinement with thumb-piece 11. The end of hinge 23 is squared or otherwise formed, as at 25, to engage the squared or otherwise formed socket 26 on the inner end of thumb-piece 11. The inner end of thumb-piece 11 is beveled or chamfered off, as shown at 27, to permit the end portion 25 of the hinge 23 to ride into the socket 26. The thumb-piece 11 is provided with a spring 28, tending to force said thumb-piece inwardly to engage the hinge 23. The thumb-piece 11 is connected with a ratchet 29, the teeth of which are engaged by spring-pawls 30, so that the thumb-piece 11 may be rotated in one direction and held from rotation in the other. Mirror 22 is secured to the hinge-pintle 23, so that by rotation of the thumb-piece 11 through its engagement with the hinge-pintle 23 the mirror 22 may be thrown upwardly against the action of spring 24, as indicated in Fig. 3, to reflect the image from the screen 9 to the operator. The frame 16 is surrounded and covered by a folding or collapsible hood 31, in the rear side of which is provided a peep-hole 32, through which the reflected image may be inspected. The proper angle of adjustment of mirror 22 is obtained by suitable manipulation of the thumb-piece 11, as described.

Mirror 22 is so formed with a projection 33 or otherwise as to engage the upper end of push-rod 12 when dropped into its horizontal position, the upper end of push-rod 12 being bent inwardly, as shown in Fig. 1, for this purpose. By this construction the dropping of the mirror 22 to its horizontal position releases latch 11, and the focusing-screen 9 is then thrown upwardly into horizontal position. (Indicated in Fig. 3.)

On the forward edge of the focusing-screen 9 is a projection or lug 35 in position to engage an extension 36 of a rod 37. The rod 37 is mounted in suitable guides 38 on the inner double wall 5$^x$ of the box 5. At its lower end rod 37 is pivotally connected with a tubular rod 39, which is mounted to lock on a pivot 40 in the front board of the box 5. Slidably mounted within rod 39 is a rod 41, which may be extended over the folding front bed 4 of the camera. Near the forward end of rod 41 is secured an upright portion 42, and from this upright portion extends an arm 43 in position to engage the trigger 44 of the lens 2. Attached to the sliding foot-piece 4 is an arm 45, the extremity of which impresses and engages the rod 41, so that this rod is moved with the lens when the same is drawn out into position. By these means when the focusing-screen is released to expose the plate-holder or the sensitive plate or film thereunder to the lens and is thrown by this spring in a horizontal position the lock 35 strikes the extension 36 and through rod 37 rocks rod 39, causing the extension 43 to trip the lens-trigger and make the exposure.

The operation of the camera is as follows: When it is desired to make an exposure, the front portion of the camera is extended and the back portion 6 withdrawn until the thumb-piece 11 snaps into aperture or depression 12. Thumb-piece 17 is then operated to throw the frame 16 into horizontal position, where bolts 18 snap outwardly over the projections 19, and thus hold the frame in position. The hood 31 (which may be provided with a spring to automatically extend the same when the camera is open) is then raised or extended, and the mirror 22 is adjusted in proper position to reflect the image from the focusing-screen 9 to the operator, who views the same through the peep-opening 32. When the image is focused and adjusted, thumb-piece 11 is withdrawn against the action of its spring 28, whereupon mirror 22 drops downwardly into horizontal position by the action of its spring 24. In this movement of the mirror part 33 strikes the upper end of push-rod 12 and releases the latch 11, thus releasing the focusing-screen 9. Under the action of its spring this screen flies upwardly and covers the mirror 22, thereby preventing reflection of light within the camera, it being understood that the screen 9 may be opaque. The movement of the screen 9 to horizontal position allows the sensitive plate or film in the plate-holder to be exposed through the lens to receive the photographic impression. When the exposure has been made, the hood 31 is collapsed, the bolts 21 are pressed, whereupon the mirror and frame 16 are released and dropped into vertical position, carrying with them the focusing-screen 9, which rides over latch 11 and is retained in this normal position. The camera may then be collapsed by sliding back 6 inwardly upon the front portion or back 5, whereupon the parts are inclosed within the camera and the camera thus reduced to compact dimensions for carrying.

I desire it to be understood that the several parts of the camera may be formed of any suitable material, but preferably of a light metal, such as aluminium, which may be suitably covered with leather, as usual. Other means than those illustrated and described may be employed for collapsing the back on the front portion of the camera—as, for instance, a bellows instead of the sliding-back arrangement, as described. It is to be understood that all the meeting surfaces are to be protected, so as to exclude all light from the interior of the camera except that which comes through the lens. This may be accomplished in the usual manner by covering the meeting edges with velvet or other suitable light-excluding material.

It will thus be seen that my invention provides a collapsible form of view-camera of simple construction and simple and convenient in operation. The interior of the camera is not obstructed by any framework or supports for the mirror or focusing-screen. The mirror is covered where the exposure is being made, thereby preventing all diffusion or reflection of light within the camera, and the screen and mirror are compactly folded into small space to allow the camera to be closed.

Various changes and modifications may be made in the several features of construction without departing from my invention, the form shown and described being merely illustrative.

Having thus described my invention, the following is what I claim as new and desire to secure by Letters Patent:

1. A camera having a collapsible body or box, a focusing-screen and a reflecting-mirror, all of the said parts contained within the body of the camera when the same is collapsed or closed.

2. A camera having a collapsible body, a focusing-screen, a reflecting-mirror and a hood surrounding said mirror, all of said parts contained within the body of the camera when the same is collapsed or closed.

3. A camera comprising a focusing-screen normally held in position to receive the image, a reflecting-mirror positioned in one of the walls of the camera, means to adjust the angle of the mirror to reflect the image to the operator, and means controlled by the mirror for automatically removing the focusing-screen out of the range of the lens.

4. A camera comprising a focusing-screen normally held in position to receive the image, a reflecting-mirror positioned in one of the walls of the camera, means to adjust the angle of the mirror to reflect the image to the operator, means controlled by the mirror for automatically removing the focusing-screen out of the range of the lens, and means for automatically operating the shutter of the lens.

5. A camera comprising a focusing-screen normally held in the focal plane of the lens, a reflecting-mirror positioned in one of the walls of the camera, means to adjust the angle of the mirror to reflect the image upon the screen to the operator, means for releasing the focusing-screen, means for automatically removing the same out of the range of the lens, means for operating the lens-shutter, said releasing means and shutter-operating means controlled by the mirror when it is returned to position.

6. A camera having a collapsible body, a focusing-screen normally covering the sensitive surface, a reflecting-mirror, means to support said mirror to form an inner wall of the camera, means to position said mirror to reflect the image to the operator, means to return the mirror to the first-mentioned position and means automatically operated on the return of the mirror to remove the focusing-screen from the sensitive surface and permit exposure of said surface.

7. A camera having a body, a focusing-screen within the camera and normally covering the sensitive surface, a reflecting-mirror, means to support said mirror to form an inner wall of the camera, means to position said mirror to reflect the image from the screen to the operator, automatically-operated means to return the mirror to the first-mentioned position, means automatically operated upon the return of the mirror to remove the focusing-screen from the sensitive surface and permit of exposure of said surface, and means for folding said screen and mirror within the body of the camera and means for collapsing the camera.

8. A camera comprising a body, a focusing-screen normally held in vertical position with respect to the axis of the lens, a reflecting-mirror hinged to the body, means to move the mirror into horizontal position, means to adjust the mirror to reflect the image from the screen to the operator, automatic means for returning the mirror to horizontal position, and means automatically operated on the return of the mirror to remove the screen from its normal position out of range of the lens.

9. A camera comprising a body, a focusing-screen normally held in vertical position with respect to the axis of the lens, a reflecting-mirror hinged to the body, means to move the mirror into horizontal position, means to adjust the mirror to reflect the image from the screen to the operator, automatic means for returning the mirror to horizontal position, and means automatically operated on the return of the mirror to remove the screen from its normal position out of range of the lens, and means whereby the mirror and screen may be folded into the camera when the same is collapsed.

10. A camera having a collapsible body comprising front and back members, a focusing-screen hinged to the back member and normally held in vertical position to cover the sensitive surface, a frame hinged to the body, a reflecting-mirror pivotally mounted in said frame, means to raise said frame and mirror into horizontal position, means to adjust said mirror in angular position to permit of viewing the image and means actuated by the return of the mirror to horizontal position to release the screen from vertical position.

11. A camera having a collapsible body, a focusing-screen hinged to the body and normally covering the sensitive surface, a frame also hinged to the body, a reflecting-mirror hinged in said frame means to raise said frame and mirror into vertical position, a hood secured to the frame and surrounding the mirror, means to raise the mirror and frame to horizontal position, means to adjust said mirror in angular position to view the image, and means actuated by the return of the mirror to horizontal position to release the focusing-screen and remove the same from its normal position to a position where it covers the mirror and permits the unobstructed exposure of the sensitive surface to the lens, substantially as described.

12. A camera comprising a body, a focusing-screen normally held in the focal plane of the lens, an adjustable reflecting-mirror, means actuated by the mirror to release the screen from its normal position and means automatically operated by the screen when the same is released for operating the lens-shutter.

13. A camera comprising a body, a focusing-screen normally held in the focal plane of the lens, an adjustable reflecting-mirror, means actuated by the mirror to release the screen from its normal position, means automatically operated by the screen when the same is released for operating the lens-shutter, and means for folding all of said parts within the body of the camera.

14. A camera of the character described comprising a collapsible box portion, a reflecting-mirror, said mirror adapted to form a wall of the camera when the same is extended, and means for folding the mirror within the camera when the same is collapsed.

15. A camera of the character described comprising a collapsible box portion, a focusing-screen and a reflecting-mirror, said mirror adapted to form the top of the box portion when the camera is extended, means for adjusting the angle of said mirror with respect to the screen to reflect the image from the screen to the operator, means controlled by the return of the mirror from adjusted position to remove the focusing-screen out of the range of the lens and to cause the same to cover the reflecting-surface of the mirror, and means for folding the screen and the mirror within the camera when the same is collapsed.

16. A camera of the character described comprising a collapsible box portion, a focusing-screen and a reflecting-mirror, said mirror adapted to form the top of the box portion when the camera is extended, means for adjusting the angle of said mirror with respect to the screen to reflect the image from the screen to the operator, and means controlled by the return of the mirror from adjusted position to remove the focusing-screen out of the range of the lens and to operate the shutter of the lens to make an exposure.

EDWARD LANDER HALL.

Witnesses:
WILLIAM P. HAMMOND,
HARRY A. KNIGHT.